W. P. SKIFFINGTON.
VALVE DEVICE.
APPLICATION FILED AUG. 26, 1916.

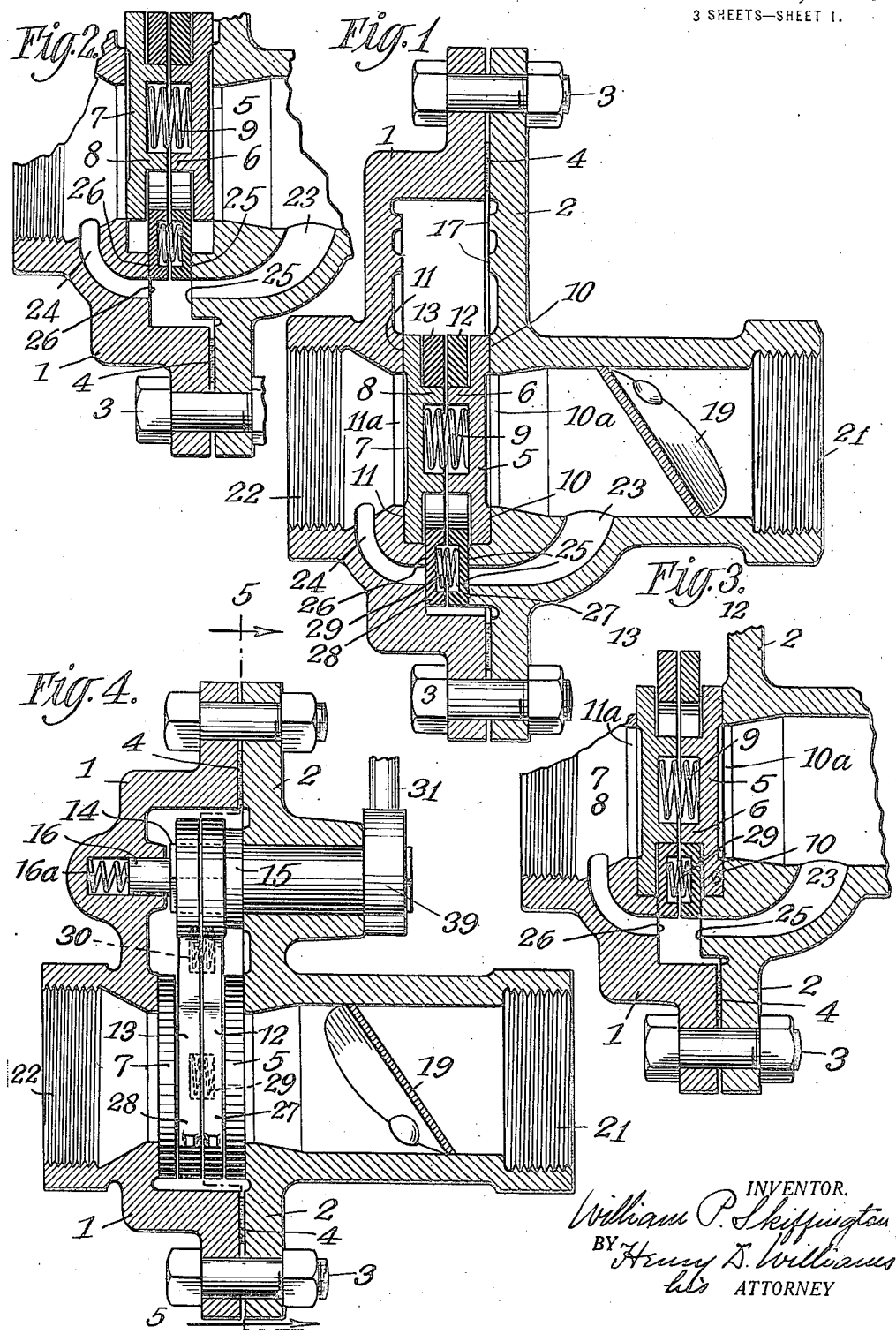

1,436,412.

Patented Nov. 21, 1922.
3 SHEETS—SHEET 2.

INVENTOR
William P. Skiffington
BY
Henry D. Williams
his ATTORNEY

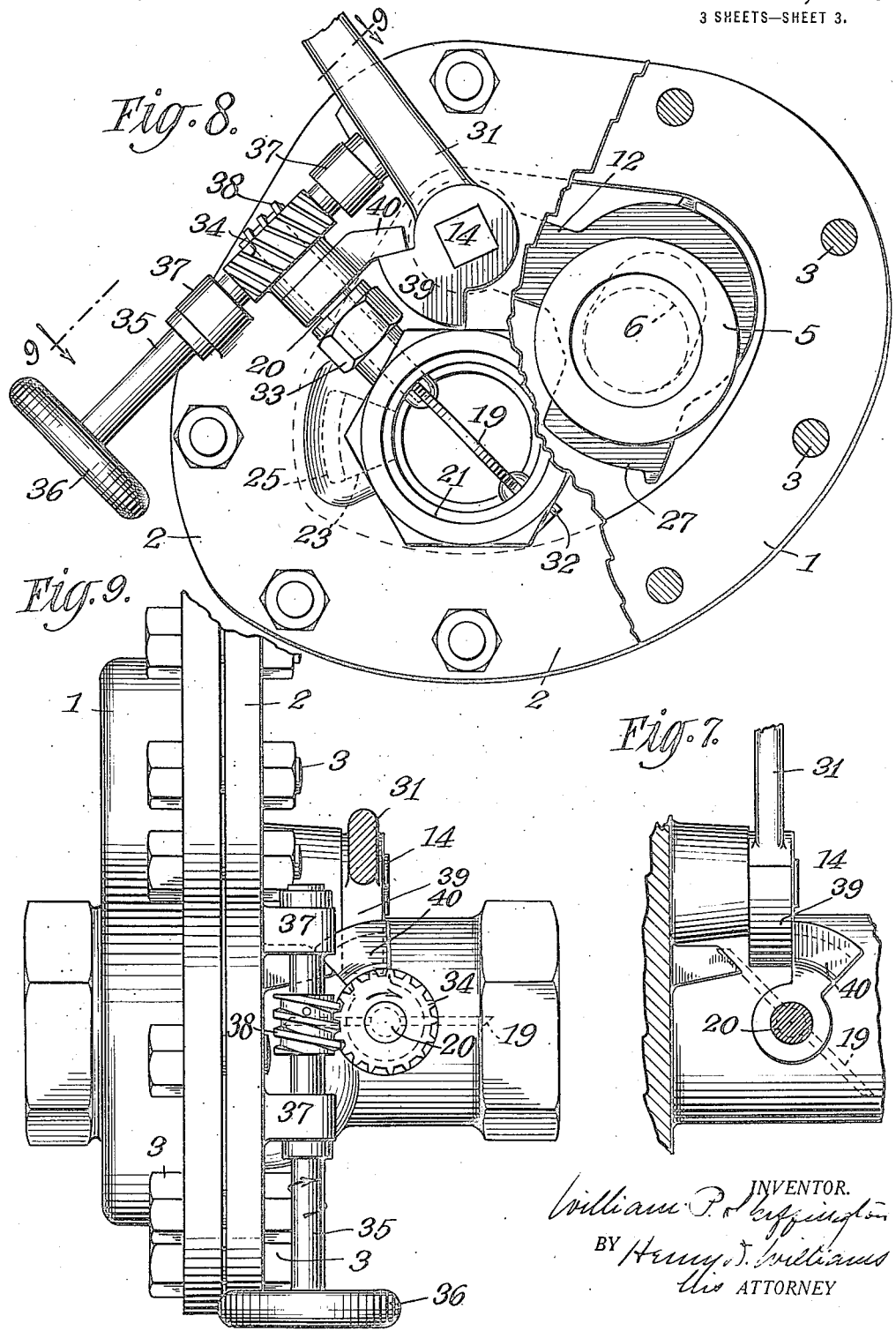

Patented Nov. 21, 1922.

1,436,412

UNITED STATES PATENT OFFICE.

WILLIAM P. SKIFFINGTON, OF NEW YORK, N. Y., ASSIGNOR TO D. G. C. TRAP & VALVE CO., INC., A CORPORATION OF NEW YORK.

VALVE DEVICE.

Application filed August 26, 1916. Serial No. 117,011.

*To all whom it may concern:*

Be it known that I, WILLIAM P. SKIFFINGTON, citizen of the United States, residing at borough of Manhattan, in the county of New York and State of New York, have invented certain new and useful Improvements in Valve Devices, of which the following is a specification, reference being had therein to the accompanying drawings, forming part thereof.

This invention relates to improvements in valves and valve devices for use in connection with the flow of fluids, such as water, steam or gas, under pressure and velocity, and more particularly to boiler blow-off valves and devices of the character set forth in Cryer application Serial No. 98736, filed May 20, 1916, comprising generally a main valve, a throttle valve, and a by-pass around the main valve for equalizing the pressures on the opposite sides thereof before operating the same.

The object of the invention generally is an improved arrangement of valve devices and operative means therefor whereby the proper sequence of operation of the valves is assured, together with a by-pass of improved structure and operating means therefor.

A further object is a combined valve arrangement which is of simple and compact construction and is entirely reliable and capable of withstanding the severe commercial service conditions.

In order to avoid scorings and abrasions of the main valve and thereby to secure a tight closure at all times, it is important to operate the main valve only with the secondary or throttle valve in closed position and with the by-pass in open position, and accordingly the invention herein comprises means for interlocking the main valve both with the by-pass and with the throttle valve so as to assure the prior opening and later closing of the by-pass with reference to the main valve and to prevent the opening or closing of the main valve while the throttle valve is open.

For a better understanding of these indicated features and objects of the invention and others which will hereinafter appear, reference may be had to the embodiment of the invention exemplified in the drawings taken in connection with the following description:

In the drawings,

Figure 1 is a central longitudinal horizontal section of the valve device on a plane indicated by the line 1—1 of Figures 5 and 6, with the main valve, by-pass valve and throttle valve all closed.

Figure 2 is a partial section on the same plane as Figure 1, illustrating a position of closing movement in which the main valve is just closed and the by-pass valve is still fully open.

Figure 3 is a similar view illustrating a position of opening movement in which the by-pass valve is fully open and the main valve has not yet begun its opening movement.

Figure 4 is a central longitudinal vertical section on a plane indicated by the line 4—4 of Figures 5 and 6, as viewed from the right in Figure 5 and from the left in Figure 6.

Figure 7 is a partial section on a plane indicated by the diagonal line 7—7 of Figure 6, viewed at an inclination from the left and above.

Figure 8 is an end elevation similar to Figure 6, but showing all of the valves open, a part of the casing being omitted to show the interior parts.

Figure 9 is an outside view looking downward at an inclination and as seen from the inclined line 9—9 of Figure 8.

Figure 5:
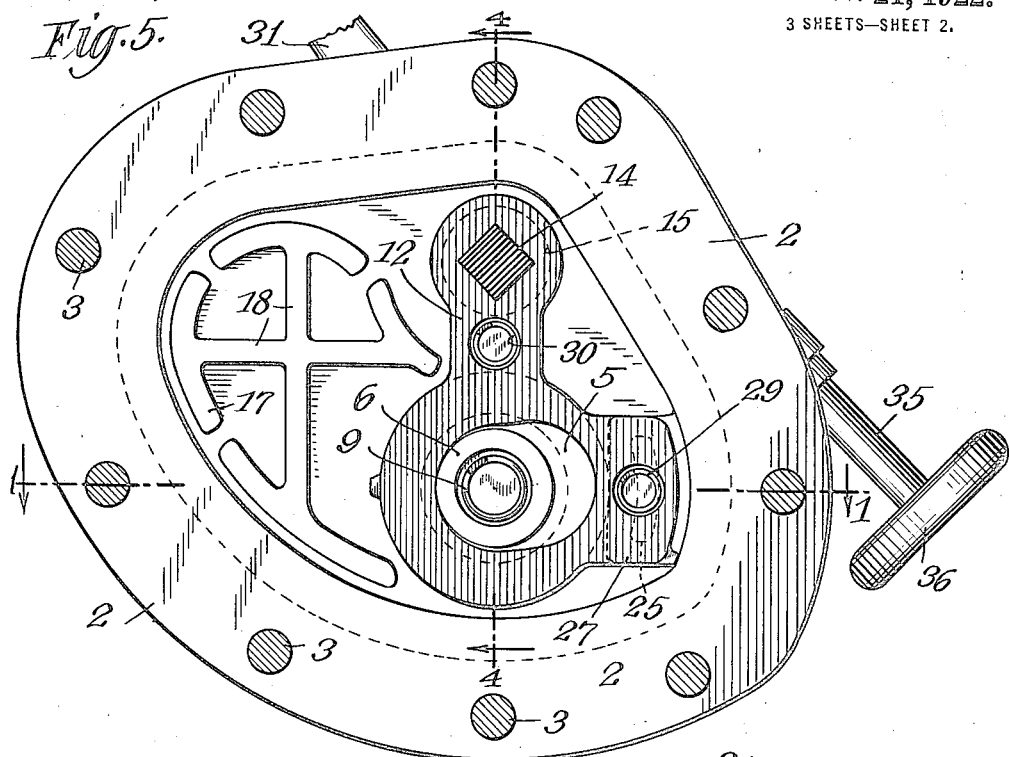
Figure 5 is a transverse section on vertical planes indicated by the offset line 5—5 of Figure 4 as viewed from the left, and shows parts of the valve device in elevation.

Referring to the accompanying drawings, the valve device there illustrated as an embodiment of my invention comprises a two-part casing having parts 1 and 2 bolted together in the ordinary manner by bolts 3. A gasket 4 is placed between the two parts of the casing for the purpose of maintaining them fluid-tight in the usual manner. The casing is so arranged that between the two parts a chamber is provided and in this chamber are placed the valve members and mechanism for operating the same.

These instrumentalities comprise a valve member 5 in the form of a disc with a boss 6 thereon, and a similar disc 7 also having a boss 8 thereon, the bosses on the two discs being placed adjacent to each other. A spring 9 is interposed between the two valve discs 5 and 7 and presses these discs toward their seats. This spring may be of any well known type, arranged in the form of a coil, contained in recesses in the valve discs, as shown in the drawings, or otherwise. The valve disc 5 bears upon an annular valve seat 10 on the casing part 2 and the valve disc 7 bears upon a similar annular seat 11 on the casing part 1. The valve seat 10 surrounds a port 10ª and the valve seat 11 surrounds a similar port 11ª, these ports being in line, as appears in the drawings. The valve discs 5 and 7 are slidably moved by means of a valve-operating member shown as comprising a divided or two-part arm having parts 12 and 13 rotatively fixed to a spindle 14 which may be operated with any suitable operating means. The spindle 14 passes through the part 2 of the casing and is provided with a flange or collar 15 bearing on the inside of the part 2 to form an extended sealing surface. The spindle 14 is also shown as journaled at 16 in the part 1 of the casing. A coiled thrust spring 16ª abuts the reduced end 16, for maintaining the collar 15 in sealing relation to the inner surface of the casing part 2. The two-part valve-operating arm, having the parts 12 and 13, is provided in its outer end with an opening and passes around the bosses 6 and 8 of the discs 5 and 7. The opening in the arm is transversely elongated and is somewhat larger in its smaller dimension than the bosses, thereby forming a loose connection permitting of self-adjustment of the valve discs, and also, by reason of its elongated transverse dimension, providing a lost-motion connection with the bosses 6 and 8 of the valve discs 5 and 7, for a purpose which will presently appear.

The part 2 of the casing is provided with guides 17 and 18 which have faces in the same plane as the valve seat 10 so that the valve member 5, when on its seat or moved from its seat moves over surfaces all in the same plane. This construction is shown in Figure 5. The guide 18, being across the passage of the valve member, also acts as a scraper to keep the same clean.

The part 1 of the casing is made to correspond in exact detail with this construction of the part 2, and the disc 7 operates in conjunction with the part 1 in the exact manner in which the disc 5 does with the part 2. By this arrangement the two discs move or slide in substantially parallel planes and are constantly pressed towards their seats or their guides by means of the spring 9. The arrangement of independent discs and a loose connection with the operating arm permits of an inexpensive construction in that it is not necessary that the valve-operating arm shall move in a plane exactly parallel with the valve seats. Consequently a slight variation in the machining or in the fitting or journaling of the spindle 14 does not seriously affect the adjustment of the valve discs, because the loose connection of the valve-operating arm with the valve discs permits of self-adjustment which overcomes any such inaccuracies of construction.

The device, as shown in the drawings, is provided with a second valve 19 which is shown in the present instance as a valve of the butterfly type. This valve member 19 is mounted on a shaft or spindle 20 journaled in part 2 of the casing. This spindle 20 may be provided with any suitable operating means for opening and closing the butterfly valve. Other forms of valve may be used with satisfaction, but I have found that the butterfly type lends itself in a peculiar manner to the construction set forth herein.

The device is provided with induction and eduction passages but the similarity of the discs 5 and 7 and their co-operating seats and guides makes the device as a whole reversible, and consequently, each of the passages 21 and 22 may be considered either as an induction or eduction passage, depending upon which way the device is connected, that is, either end of the device may be the induction end or the eduction end. The device will satisfactorily operate when connected either way, but I prefer to make the shorter passage 22 the induction and the longer passage 21 containing the butterfly throttle valve 19, the eduction. These two passages are shown as screw-threaded at their outer ends so that they may be readily connected where desired.

Arranged around the main valve comprising the valve discs 5 and 7 and the two-part operating arm having the parts 12 and 13 is a two-part by-pass having the parts 23 and 24. The by-pass part 23 communicates with the chamber in which the main valve is placed and also communicates with the chamber formed in the eduction passage 21 between the butterfly valve member 19 and the main valve member 5, as shown in Figure 1. The other by-pass part 24 similarly connects the main valve chamber with the induction passage 22. It will be noted that the by-pass is formed in the parts 1 and 2 of the casing of the valve, which arrangement makes the device self-contained and simple in construction. The inner ends of the respective by-pass parts 23 and 24 form ports in line opening into the main valve chamber between the casing parts 1 and 2, these ports being of comparatively narrow arcuate form, as appears most clearly in dotted lines in Figure 8 in reference to the by-pass part 23 in the casing part 2. By-pass valve seats 25 and 26 are provided in the main valve chamber for the ports of the respective by-pass parts 23 and 24, these valve seats 25 and 26 being shown as offset inwardly from the main valve seats 10 and 11, respectively.

The by-pass is controlled by a two-part sliding by-pass valve carried by the valve-operating member having the two parts 12 and 13. A lateral extension 27 on the arm part 12 forms a valve member co-operative with the valve seat 25 of the by-pass part 23; and a similar extension 28 on the other arm part 13 forms a valve member co-operative with the valve seat 26 of the by-pass part 24. The members 27 and 28 of the by-pass valve are pressed toward their seats by an interposed thrust spring 29, shown as a coiled spring recessed into the valve members. A second similar spring 30 between the arm parts 12 and 13 assists the spring 29, the arm parts 12 and 13 being loosely mounted for longitudinal movement on the squared inner end of the spindle 14, and these arm parts having a slight clearance relative to the valve discs 5 and 7, as appears in Figures 1 to 4 inclusive of the drawings. The raised or projecting edges of the by-pass seats 25 and 26 adjacent to the main valve seats 10 and 11 are shown as slightly tapered or rounded to assure the seating of the sliding members 27 and 28 of the by-pass valve in its closing movement.

The spindle 14, which carries the two-part valve-operating member having the arm parts 12 and 13, has an operating handle or wrench 31 fixed upon its outer end. Both the main valve and the by-pass valve are operated by a single valve-opening or valve-closing movement of the handle 31. The hereinbefore described lost-motion connection of the valve-operating arm with the valve discs 5 and 7 prevents the opening of the main valve until after the by-pass has been opened. This stage of the valve-opening movement appears in Figure 3 of the drawings. It is to be noted of the construction illustrated in the drawings that the over-lap of the valve discs 5 and 7 upon their seats 10 and 11 is substantially greater than the lap of the by-pass valve members 27 and 28 on their seats 25 and 26, thereby preventing the closing of the by-pass before the closing of the main valve. This stage of the valve-closing movement is illustrated in Figure 2 of the drawings. From this construction it will be seen that it is impossible to operate the main valve to open it without first opening the by-pass and likewise it is impossible to close the by-pass until after the main valve has been closed. This arrangement, together with the throttle valve 19, provides for the operating of the main valve without a difference of pressure on its two sides.

The butterfly throttle valve 19, at a point opposite its shaft or spindle 20, is pivoted on a stud 32. A usual stuffing-box 33 is shown as provided for the throttle valve shaft 20. The throttle valve shaft 20 at its outer end is provided with a worm gear 34. A spindle 35 is also provided and has a hand wheel 36 for operating the same. This spindle 35 is journaled in two lugs 37 cast on part 2 of the main valve casing. This spindle is provided with a worm 38 arranged to engage the worm gear 34 to operate the throttle valve 19. The worm gearing and spindle 35 provide means for holding the throttle valve 19 in any desired position, and also for the gradual opening and closing of the throttle valve, thus avoiding possible water hammer or like effect.

In the valve device as so far described there is nothing to prevent the opening or the closing of the main valve under a condition of unbalanced pressure of fluid, but the precaution would need to be taken to first close the throttle valve 19 before operating the main valve, as obviously otherwise the pressure of fluid upon the opposite sides of the main valve could not be equalized. Accordingly I provide means for locking the main valve, and also the by-pass valve, against movement when the throttle valve 19 is open, and for permitting the movement of the main valve and the by-pass valve only in the closed position of the throttle valve. I provide interlocking means between the main valve and the throttle valve for locking the main valve open when the throttle valve is open and for locking the throttle valve closed when the main valve is closed. This arrangement leaves the main valve at all times free to be opened under a condition of balanced pressure, without need of paying any attention to the throttle valve; and, furthermore, there is no occasion to open the throttle valve while the main valve is closed, although this could be readily provided for.

The throttle valve shaft 20 is arranged at such an angle as will bring it into such proximity to the main valve spindle that the throttle valve shaft may be brought into interlocking relationship with the main valve spindle 14, and is shown at substantially an angle of forty-five degrees, but this may be varied to suit. The operating handle 31 is provided with a locking segment 39, shown as projecting radially and as substantially sector-shaped; and the throttle valve shaft 20 has fixed thereon, inward from the worm wheel 34, a locking segment 40 which is cooperative with the locking segment 39 and which is shown as substantially of sector-shape and as inclined so as to have radial interlocking engagement with the locking segment 39.

Figure 6:
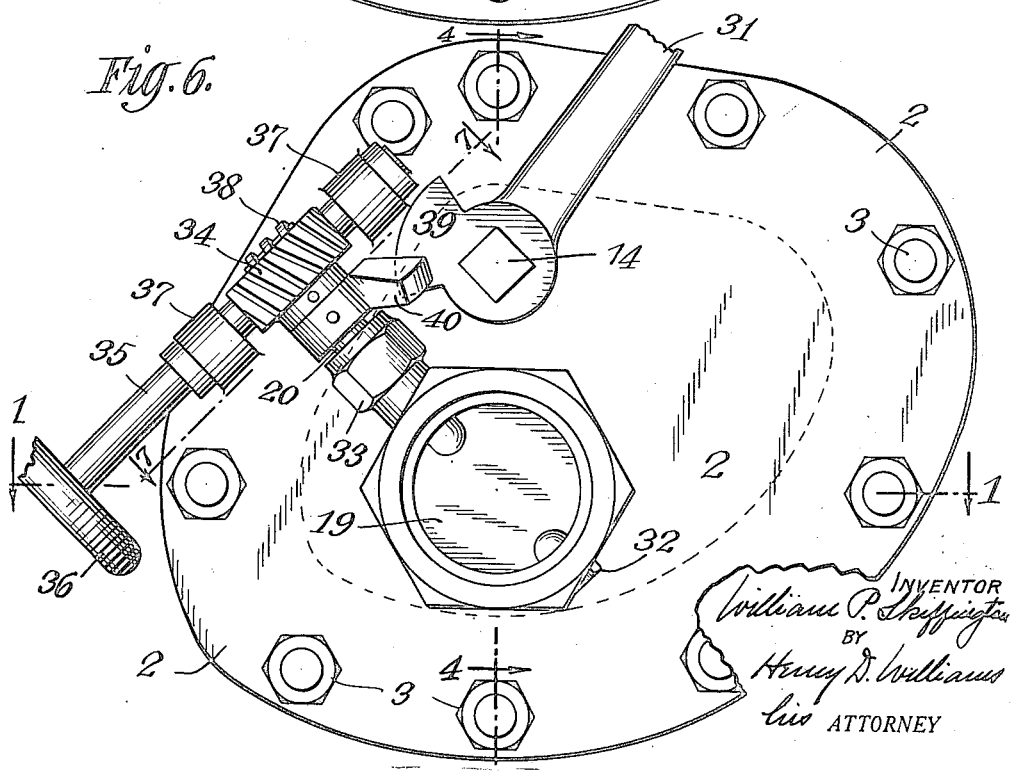
Figure 6 is an end elevation of the complete device as viewed from the right in Figure 4.

When the main valve is in the closed position, as appears in Figures 1 to 7 inclusive of the drawings, the locking segment 40 on the throttle valve shaft 20 abuts against the locking segment 39 on the main valve spindle 14 and thereby the throttle valve is locked at the closed position illustrated in these figures, as clearly appears in Figures 6 and 7. However, it is to be noted that the handle 31 is free to be moved in a counter-clockwise direction as viewed in Figure 6, for successively opening the by-pass valve and the main valve, with the throttle valve thus locked in the closed position throughout the opening movement of the main valve, the locking segment 39 on the main valve spindle 14 being of sufficient and of the correct arcuate or angular length to effect this result. Therefore, in the illustrated construction, the main valve is prevented from being opened while the throttle valve is open, by reason of the fact that the throttle valve is locked at the closed position when the main valve is closed and during the opening movement of the main valve.

It is only after the main valve has been moved to the completely open position, illustrated in Figures 8 and 9, that the throttle valve can be opened at all, and then it may be opened more or less as desired, for throttling or regulating the flow of fluid, and is shown in Figures 8 and 9 as at the wide open position. In this position of the throttle valve, and also in any position thereof except the tightly closed position, the locking segment 39 on the main valve spindle 14 abuts against the lower side of the locking segment 40 on the throttle valve shaft 20 and locks the main valve at the wide open position illustrated in Figures 8 and 9, the locking segment 40 being of sufficient angular or arcuate length to effect this result, as clearly appears in the drawings. It is evident that the throttle valve 19 must be closed, thereby permitting the pressure of fluid to become equalized at the opposite sides of the main valve, before the main valve can be closed. The main valve may be either opened or closed when the throttle valve 19 is closed, and at no other time can it be moved. This complete arrangement prevents the opening or the closing of the main valve while difference of pressure exists at the opposite sides thereof.

The operation of the device is as follows:

Assuming that the device is connected in a line of pipe handling fluids of high pressure and that the main valve is closed and it is desired to open it, the handle 31 is moved to the left from the position shown in Figure 6 and the by-pass valve is opened, the valve members 27 and 28 thereof being moved from the closed position appearing in Figure 1 to the open position shown in Figure 3, the lost-motion between the arm members 12 and 13 and the bosses 6 and 8 of the valve discs 5 and 7 being taken up. This opening of the by-pass equalizes the pressures on the two sides of the main valve, and also in the main valve chamber, the throttle valve 19 being locked closed. As the handle 31 is moved further, the lost-motion having been taken up in opening the by-pass valve, the main valve will be swung open by means of the spindle 14 and valve-operating arm having the two-parts 12 and 13. The balancing or equalizing of the pressure at the opposite sides of the main valve renders the opening of the main valve easy of accomplishment and the absence of difference of pressure on the opposite sides of the main valve eliminates the liability of scoring or abrading the valve seat or the face of the valve disc 5 or 7 as the case may be. After the main valve has been moved to the fully open position, appearing in Figure 8, then, and only then, the throttle valve can be operated. The throttle valve 19 is then opened by turning the wheel 36, and the flow of fluid through the main valve is regulated by the valve 19. One of the advantages of the butterfly type of valve is that the pressure on the two wings of the valve almost equalize each other and this valve, notwithstanding the presence of difference of pressure on induction and eduction sides, is easily operated. Other advantages are its ease of replacement, simplicity and inexpensiveness.

When it is desired to close the main valve of the device the operation is the exact reverse of the opening and consists of first closing the throttle valve 19, then moving the handle 31 to the right as seen in Figure 8, thereby closing the main valve and the by-pass valve in the order named. This earlier closing of the main valve and later closing of the by-pass valve is particularly illustrated in Figure 2.

It is not essential that the throttle valve be fluid-tight, but only that it be sufficiently so to render possible a rapid equalization of pressures on the opposite sides of the main valve by the by-pass.

It is to be noted that the part 23 of the by-pass extends from the main valve chamber around the valve disc 5 and its seat 10 to the eduction passage 21, inward from the throttle valve 19, and that the other by-pass part 24 similarly extends around the other valve disc 7 and its seat 11 to the induction passage 22; and it is to be further noted that these by-pass parts 23 and 24 are similarly controlled by the spring-pressed by-pass valve members 27 and 28, being similar in construction and operation to the main valve having the spring-pressed valve members or discs 5 and 7. By reason of this construction of the by-pass and its controlling valve, it is evident that the pressure of fluid at the opposite sides of the main valve will be equally well equalized, should the eduction passage 21, containing the butterfly throttle valve 19, be made the induction passage of the device, that is, should the device as a whole be reversed from the way in which it is preferred to connect it. This makes it an impossibility to render the device non-operative by reason of a mistake in connecting it in place in installing it.

Also the balancing or equalizing of the pressure in the main valve chamber with that in both the induction and eduction passages, permits both valve discs 5 and 7 to be similarly held on their seats and guides in the opening and closing movements, thereby assuring that the faces of both of these discs will be similarly kept scraped clean and free of incrustations.

From the above description it will be apparent that I have provided a simple and compact arrangement which is easily and quickly operated and in which the main valve is always operated without difference of pressure on its two sides, thus assuring long life, by avoiding wire-drawing or abrasion and securing efficient operation.

While I have shown the device as at present preferred by me, nevertheless my invention is not, in any manner, limited to the exact construction of any of the parts, but resides in the combination of elements as hereinafter set forth in the claims.

I claim:

1. In a device of the character described, the combination of a main valve, a by-pass being provided around the main valve, and means preventing the closure of said main valve while difference of pressure exists at the opposite sides thereof.

2. A valve device comprising a main valve and a throttle valve arranged in tandem, means for equalizing the pressure of fluid at the opposite sides of the main valve, and locking means for preventing the movement of the main valve except in the closed position of the throttle valve.

3. A valve device comprising a main valve and a throttle valve arranged in tandem, and locking means for preventing the movement of the main valve except in the closed position of the throttle valve.

4. A valve device comprising a main valve and a throttle valve arranged in tandem, a by-pass being provided around the main valve, a valve in control of the by-pass, and locking means for preventing the movement of the main valve except in the closed position of the throttle valve.

5. A valve device comprising a main valve and a throttle valve arranged in tandem, a by-pass being provided around the main valve, a valve in control of the by-pass and locking means for preventing the movement of the by-pass valve except in the closed position of the throttle valve.

6. A valve device comprising a main valve and a throttle valve arranged in tandem, a by-pass being provided around the main valve, a valve in control of the by-pass, and locking means for preventing the movement of the main valve and the by-pass valve except in the closed position of the throttle valve.

7. A valve device comprising a main valve and a throttle valve arranged in tandem, and interlocking means between the main valve and the throttle valve for locking the main valve open when the throttle valve is open and for locking the throttle valve closed when the main valve is closed.

8. A valve device comprising a main valve and a throttle valve arranged in tandem, means for locking the main valve against movement when the throttle valve is open, a by-pass being provided around the main valve, a valve in control of the by-pass, and means for compelling the opening of the by-pass valve before the main valve can be opened.

9. A valve device comprising a main valve and a throttle valve arranged in tandem, means for locking the main valve against movement when the throttle valve is open, a by-pass being provided around the main valve, a valve in control of the by-pass, and means for compelling the closing of the main valve in advance of the closing of the by-pass valve.

10. A valve device comprising a main valve and a throttle valve arranged in tandem, means for locking the main valve against movement when the throttle valve is open, a by-pass being provided around the main valve, a valve in control of the by-pass, and means for compelling the earlier opening and later closing of the by-pass valve as compared with the opening and closing of the main valve.

11. A valve device comprising a main valve and a throttle valve arranged in tandem, means for locking the main valve against movement when the throttle valve is open, a by-pass being provided around the main valve, a valve in control of the by-pass, and means for successively opening the by-pass valve and the main valve in the order named.

12. A valve device comprising a main valve and a throttle valve arranged in tandem, means for locking the main valve against movement when the throttle valve is open, a by-pass being provided around the main valve, a valve in control of the by-pass, and means for successively closing the main valve and the by-pass valve in the order named.

13. A valve device comprising a main valve and a throttle valve arranged in tandem, means for locking the main valve against movement when the throttle valve is open, a by-pass being provided around the main valve, a valve in control of the by-pass, and means for successively opening the by-pass valve and the main valve in the order named and for closing them in the reverse order named.

14. In a device of the character described, the combination of a main valve, and means preventing the closure of said main valve while difference of pressure exists at the opposite sides thereof.

15. In a device of the character described, the combination of a main valve, and means preventing opening and closing of said main valve while difference of pressure exists at the opposite sides thereof.

16. A valve device comprising a valve casing having a chamber therein provided with a valve seat, a valve disc co-operative with the valve seat, a by-pass being provided from the valve chamber around the valve seat, a valve-operating member having a lost-motion operating connection with the valve disc, and a by-pass valve carried by the valve-operating member.

17. A valve device comprising a valve casing having ports in line and having a chamber therein provided with two similar valve seats for the ports, two similar valve discs, one for each seat and port, a by-pass being provided from the valve chamber around one of the valve seats, a valve-operating member having a similar lost-motion connection with each of the valve discs, and a by-pass valve carried by the valve-operating member.

18. A valve device comprising a valve casing having ports in line and having a chamber therein provided with two similar valve seats for the ports, two similar valve discs, one for each seat and port, a by-pass being provided from the valve chamber around one of the valve seats, a valve-operating member having a similar lost-motion connection with each of the valve discs, a by-pass valve carried by the valve-operating member, and a throttle valve arranged in tandem with the valve discs beyond the end of the by-pass.

19. A valve device comprising a valve casing having ports in line and having a chamber therein provided with two similar valve seats for the ports, two similar valve discs, one for each seat and port, a two-part by-pass being provided of which one part extends from the valve chamber around each of the valve seats and discs, a valve-operating member having a similar lost-motion connection with each of the valve discs, and a by-pass valve carried by the valve-operating member.

20. A valve device comprising a valve casing having ports in line and having a chamber therein provided with two similar valve seats for the ports, two similar valve discs, one for each seat and port, a two-part by-pass being provided of which one part extends from the valve chamber around each of the valve seats and discs, a valve-operating member having a similar lost-motion connection with each of the valve discs, a by-pass valve carried by the valve-operating member, and a throttle valve arranged in tandem with the valve discs beyond one of the ends of the by-pass whereby the valve discs can be moved under a condition of balanced pressure regardless of which end of the device is made the induction end.

21. A valve device comprising a valve casing having ports in line and having a chamber therein provided with two similar valve seats for the ports, two similar valve discs, one for each seat and port, a two-part by-pass being provided of which one part extends from the valve chamber around each of the valve seats and discs, the by-pass having ports in line opening into the valve chamber and similar valve seats being provided in the chamber for the by-pass ports, a two-part valve-operating arm having a lost-motion connection with the valve discs, an extension on each part of the two-part valve-operating arm, each such extension forming a member of a two-part by-pass valve co-operative with the by-pass valve seats, and springs tending to hold the valve discs and the by-pass valve members on their seats.

22. A valve device comprising a valve casing having ports in line and having a chamber therein provided with two similar valve seats for the ports, two similar valve discs, one for each seat and port, a two-part by-pass being provided of which one part extends from the valve chamber around each of the valve seats and discs, the by-pass having ports in line opening into the valve chamber and similar valve seats being provided in the chamber for the by-pass ports, a two-part valve-operating arm having a lost-motion connection with the valve discs, an extension on each part of the two-part valve-operating arm, each such extension forming a member of a two-part by-pass valve co-operative with the by-pass valve seats, springs tending to hold the valve discs and the by-pass valve members on their seats, and a throttle valve arranged in tandem with the valve discs beyond one of the ends of the by-pass.

23. A valve device comprising a main stop valve and a balanced regulating valve arranged in tandem, and locking means for preventing the movement of the main stop valve except in the closed position of the balanced regulating valve.

24. A valve device comprising a main stop valve and a balanced regulating valve arranged in tandem, a by-pass being provided around the main stop valve and communicating with the space between said valves, a valve in control of the by-pass, and locking means for preventing the movement of the main stop valve except in the closed position of the balanced regulating valve.

25. A valve device comprising a main stop valve and a balanced regulating valve arrange in tandem, a by-pass being provided around the main stop valve and communicating with the space between said valves, a valve in control of the by-pass, and locking means for preventing the movement of the main stop valve and the by-pass valve except in the closed position of the balanced regulating valve.

26. A valve device comprising a main stop valve and a balanced regulating valve arranged in tandem, a by-pass being provided around the main stop valve and communicating with the space between said valves, a valve in control of the by-pass, means for compelling the opening of the by-pass valve before the main stop valve can be opened, and means for locking the main stop valve against movement when the balanced regulating valve is open.

27. A valve device comprising a main stop valve and a balanced regulating valve arranged in tandem, a by-pass being provided around the main stop valve and communicating with the space between said valves, a valve in control of the by-pass, means for compelling the earlier opening and later closing of the by-pass valve as compared with the opening and closing of the main stop valve, and means for locking the main stop valve against movement when the balanced regulating valve is open.

28. A valve device comprising a main stop valve and a balanced regulating valve arranged in tandem, a by-pass being provided around the main stop valve and communicating with the space between said valves, a valve in control of the by-pass, means for successively closing the main stop valve and the by-pass valve in the order named, and means for locking the main stop valve against movement when the balanced regulating valve is open.

29. A valve device comprising a main stop valve and a balanced regulating valve arranged in tandem, a by-pass being provided around the main stop valve and communicating with the space between said valves, a valve in control of the by-pass, means for successively opening, the by-pass valve and the main stop valve in the order named and for closing them in the reverse order named, and means for locking the main stop valve against movement when the balanced regulating valve is open.

30. In a device of the character described, the combination of a main valve, a by-pass around the main valve and means preventing opening and closing of said main valve while difference of pressure exists on the sides thereof.

31. A valve device comprising a valve seat, a sliding valve disc cooperating with said valve seat, a by-pass around said valve seat, a valve seat in the by-pass, a sliding valve member cooperating with the last-named valve seat and operating means for the said sliding valve members comprising lost-motion connections whereby the valves are opened and closed in the reversed order.

32. A valve device comprising a main valve and throttle valve arranged in tandem, a by-pass being provided around the main valve, a valve in control of the by-pass and locking means for preventing the opening and closing of the by-pass valve when the throttle valve is open.

33. In a valve device of the character described, the combination of a main valve with operating means therefor, a by-pass around the main valve, a throttle valve in tandem with the main valve together with operating means therefor and interlocking connections between the operating means for the main valve and the throttle valve such that the throttle valve can be opened and closed only when the main valve is entirely open and the main valve cannot be either opened or closed while the throttle valve is in open position.

In testimony whereof I have affixed my signature.

WILLIAM P. SKIFFINGTON.